United States Patent
Coe et al.

(10) Patent No.: US 10,684,951 B2
(45) Date of Patent: *Jun. 16, 2020

(54) MINIMIZING CACHE LATENCIES USING SET PREDICTORS

(71) Applicant: International Business Machines Corporation, Armonk, NY (US)

(72) Inventors: Dwifuzi Coe, Poughkeepsie, NY (US); Christian Jacobi, Poughkeepsie, NY (US); Markus Kaltenbach, Boeblingen (DE); Eyal Naor, Tel Aviv (IL); Martin Recktenwald, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/669,108

(22) Filed: Aug. 4, 2017

(65) Prior Publication Data
US 2019/0042468 A1    Feb. 7, 2019

(51) Int. Cl.
*G06F 12/0864* (2016.01)
*G06F 12/0811* (2016.01)
*G06F 12/1045* (2016.01)

(52) U.S. Cl.
CPC ...... *G06F 12/0864* (2013.01); *G06F 12/0811* (2013.01); *G06F 12/1063* (2013.01); *G06F 2212/1016* (2013.01); *G06F 2212/6032* (2013.04); *G06F 2212/6082* (2013.01)

(58) Field of Classification Search
CPC .............. G06F 2212/6032; G06F 2212/6082
See application file for complete search history.

(56) References Cited

U.S. PATENT DOCUMENTS

| | | | | |
|---|---|---|---|---|
| 5,418,922 A | * | 5/1995 | Liu | G06F 12/0864 711/128 |
| 5,918,245 A | | 6/1999 | Yung | |
| 6,138,209 A | * | 10/2000 | Krolak | G06F 12/0864 711/122 |
| 6,247,094 B1 | * | 6/2001 | Kumar | G06F 12/0862 711/118 |
| 6,427,188 B1 | * | 7/2002 | Lyon | G06F 12/0864 711/122 |
| 7,278,012 B2 | | 10/2007 | Sartorius et al. | |
| 9,262,327 B2 | | 2/2016 | Steely, Jr. et al. | |

(Continued)

OTHER PUBLICATIONS

List of IBM Patents or Patent Applications Treated as Related, Nov. 17, 2017, 2 pages.

(Continued)

*Primary Examiner* — Nathan Sadler
(74) *Attorney, Agent, or Firm* — Heslin Rothenberg Farley & Mesiti P.C.; William A. Kinnaman, Esq.

(57) ABSTRACT

A processor(s) performs a cache access to retrieve data, wherein the cache access by initiating a request that includes an address of a first address type. The cache access includes the processor(s) generating, based on historical data related to the address, a prediction for a location of the data in the cache that is a set identifier of a predicted cache set. The processor(s) concurrently perform a data access to the cache to retrieve sets in the cache. The processor(s) confirm(s) that the retrieved include the predicted cache set. The processor (s) utilize(s) the set identifier to select data from the predicted set.

3 Claims, 10 Drawing Sheets

(56) References Cited

U.S. PATENT DOCUMENTS

| | | | |
|---|---|---|---|
| 9,311,239 B2 | 4/2016 | Cooray et al. | |
| 2002/0161976 A1* | 10/2002 | Ito | G06F 12/0855 |
| | | | 711/128 |
| 2004/0215882 A1* | 10/2004 | Alexander | G06F 12/0864 |
| | | | 711/128 |
| 2006/0236074 A1* | 10/2006 | Williamson | G06F 12/0864 |
| | | | 711/216 |
| 2010/0049912 A1* | 2/2010 | Mylavarapu | G06F 1/3203 |
| | | | 711/108 |
| 2014/0115264 A1* | 4/2014 | Shirahige | G06F 12/0895 |
| | | | 711/137 |
| 2018/0349284 A1* | 12/2018 | Lai | G06F 12/0895 |
| 2019/0018780 A1* | 1/2019 | Jacobi | G06F 12/0862 |

OTHER PUBLICATIONS

Coe, Dwifuzi, "Minimizing Cache Latencies Using Set Predictors," U.S. Appl. No. 15/815,378, filed Nov. 16, 2017, pp. 1-48.

Mell et al., "The NIST Definition of Cloud Computing", National Institute of Standards and Technology, U.S. Dept. of Commerce, NIST Special Publ. 800-145, Sep. 2011, 7 pages.

Acacio et al., "The Use of Prediction for Accelerating Upgrade Misses in CC-Numa Multiprocessors", Parallel Architectures and Compilation Techniques, 2002. Proceedings International Conference on Sep. 2002. http://ieeexplore.ieee.org/document/1106014/, 10 pages.

* cited by examiner

MINIMIZING CACHE LATENCIES USING SET PREDICTORS

BACKGROUND

A cache in a processing unit is a smaller, faster, memory used by the processing unit (e.g., the central processing unit (CPU)) of a computer to reduce the average time to access memory. A processing unit utilizes caches to store copies of data from frequently used main memory locations. Many CPUs have different independent caches, including instruction and data caches. Data and instruction caches are generally organized as a hierarchy of more cache levels: level 1 (L1), level 2 (L2), etc. These different caches may work together in a single or multiple processor environment to improve computer performance.

Cache access latency is a major performance contributor to a microprocessor design. The time taken to fetch one cache line from memory, including latency due to a cache miss, affects performance because a CPU will run out of things to do while waiting for the cache line. When a CPU reaches this state, it is called a stall. As CPUs become faster compared to main memory, stalls due to cache misses displace more potential computation. To illustrate this latency, consider that some current CPUs can execute hundreds of instructions in the time taken to fetch a single cache line from main memory.

SUMMARY

Shortcomings of the prior art are overcome and additional advantages are provided through the provision of a method of performing a cache access with lower access latency. The method includes, for instance: performing, by one or more processors, a cache access to retrieve data, wherein the cache access is initiated with a request comprising an address of a first address type, wherein the access comprises: generating, by the one or more processors, based on historical data related to the address of the first address type, a prediction for a location of the data in the cache comprising a set identifier of a predicted cache set; concurrently with the generating, performing, by the one or more processors, a data access to the cache to retrieve sets in the cache; confirming, by the one or more processors, that the retrieved sets comprise the predicted cache set indicated by the set identifier; and based on the confirming, utilizing, by the one or more processors, the set identifier to select data from the predicted set.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
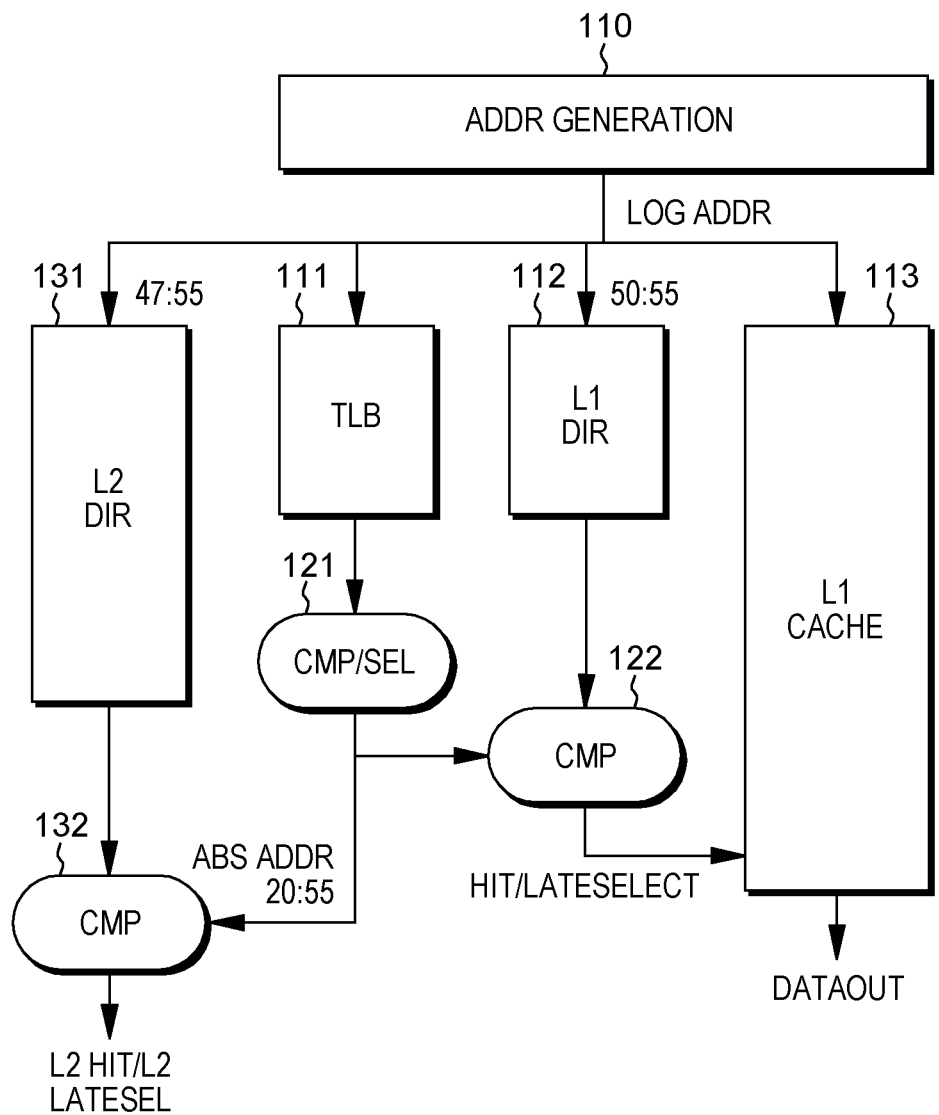
FIG. 1 illustrates a cache scheme in a computing system where certain aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 9:
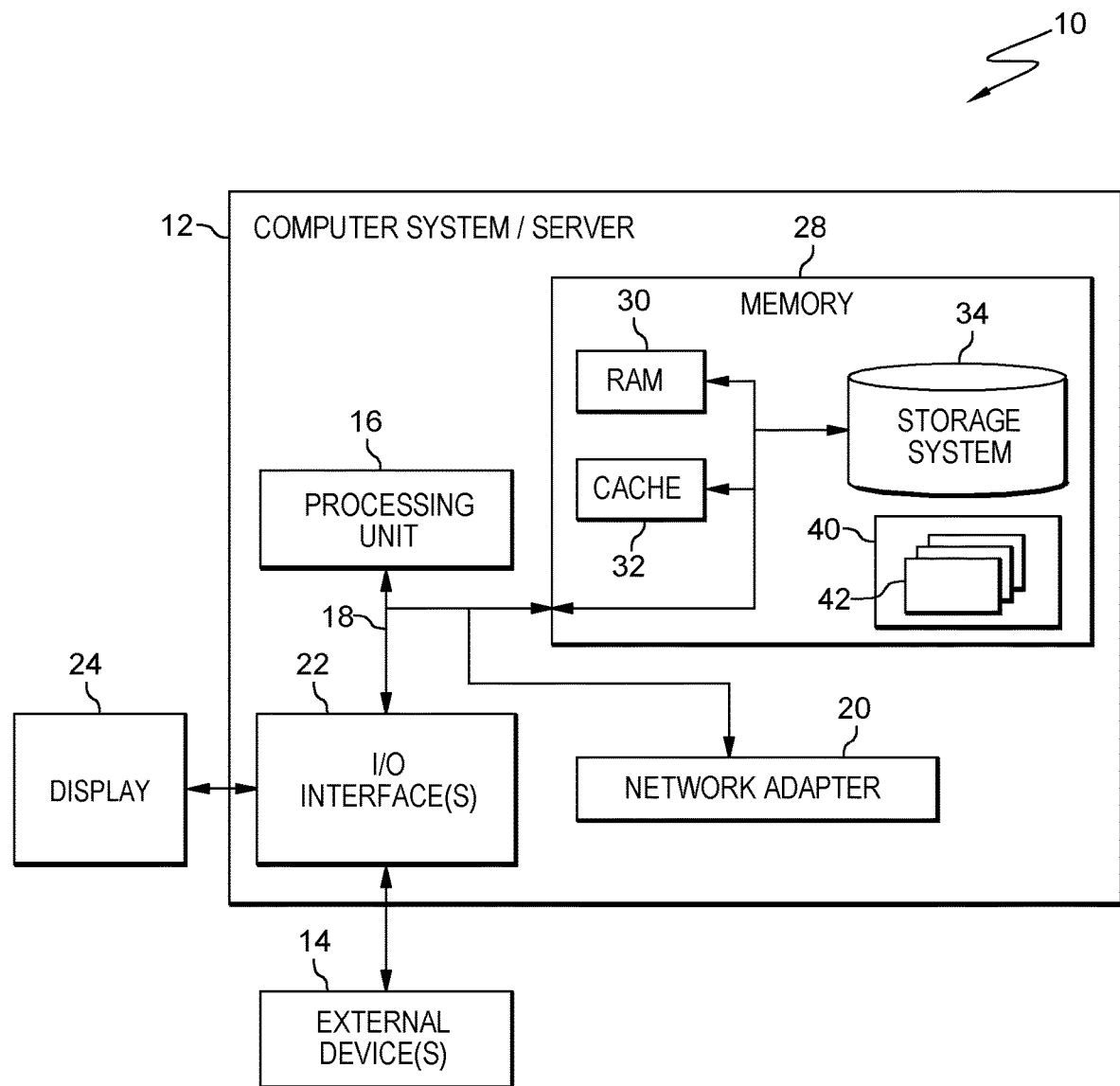
FIG. 9 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 9 as program/utility 40, having a set (at least one) of program modules 42, may be stored in memory 28.

A current approach to minimizing cache access latencies is to utilize set predictors to improve both cache access latency as well as, potentially, power consumption, for set-associative caches. A set-associative cache scheme is a combination of fully associative and direct mapped schemes. Slots are grouped into sets. One can locate the appropriate set for a given address, as in a direct mapped scheme, and within the set, one can locate the appropriate slot, like in a fully associative scheme. Utilizing the hybrid scheme results in fewer collisions because more slots are available, even when cache lines map to the same set. Rather than access the entirety of a memory subsystem to access desired data, program code referred to as a set predictor "guesses" a set for an address where the desired data may be located, based on historical accesses. Based on the predicted set, the data is accessed from the memory, and can be delivered, speculatively, concurrently with the program code verifying that this guess was correct.

In some systems, a single level of set prediction is applied. Utilizing this single level method, a set predictor "guesses" a correct set, based on earlier data. The performance of the computer system is improved because, as aforementioned, this guess can be verified after, or concurrently, with the delivery of the speculative set. The improvements to latency and power consumption provided by this single level method are not realized in more complex cache systems. For example, in a cache structure with a low-latency cache hierarchy (e.g., a tightly integrated L1 and L2 caches), single level of set prediction may not improve latency in a way that will meaningfully impact processing. Additionally, current single level set prediction techniques are inoperable for L2 cache set predictions because the L2 cache is typically significantly larger and may hold data from many different address spaces at the same time.

If the CPU does not find the information that it needs in an L1 cache, it checks the L2 cache. When the L1/L2 caches are tightly coupled, it is likely that accesses to both caches will be needed to find the sought after information and accesses to the L2 cache introduce latency issues, which can be mitigated by utilizing aspects of embodiments of the present invention. To minimize cache access latencies in more complex computing systems where accesses to the L2 cache are likely, including but not limited to a tightly integrated L1/L2 cache design and/or a typical L2 cache application, embodiments of the present invention include a computer-implemented method, a computer program product, and a computer system where program code utilizes two levels of set predictors.

In an aspect of some embodiments of the present invention, program code executing on at least one processor, utilizes partial address information to predict which set will have a cache hit. To make this prediction, program code in some embodiments of the present invention maintains historical information and predicts cache hits based on the historical information. As is explained above, the terms program code is used interchangeably for both hardware and software implementations of aspects of embodiments of the present invention. Thus, in some embodiments of the present invention, hardware maintains this historical information, and the hardware utilizes part of the address information, which can be specified by software. Thus, in this embodiment, the utilization of the address information to find the correct data is under hardware (processor) control.

As will be explained in greater detail herein, the program code making this prediction, referred to as a set predictor, dynamically adjusts its hit comparisons based on the history of previous set prediction results. In some embodiments of the present invention, an L2 set predictor (l2setp) targets typical L2 cache applications. In an aspect of some embodiments of the present invention, a set predictor accesses L2 cache arrays early, i.e., without waiting for a translation lookaside buffer (TLB) lookup and a comparison of the result between the TLB and the L2 directory, to verify the access. Waiting for the lookup in the TLB before accessed the L2 cache, adversely affects performance of the computing system. By enabling the computing system to skip this wait, the set predictor aspect improves the performance of a computing system when executed instructions dictate accesses to an L2 cache. For example, utilization of this set predictor can yield significant performance benefits for a tightly coupled L1/L2 cache structure, including a structure that includes an L2 processor cache with virtual memory support.

Figure 2:
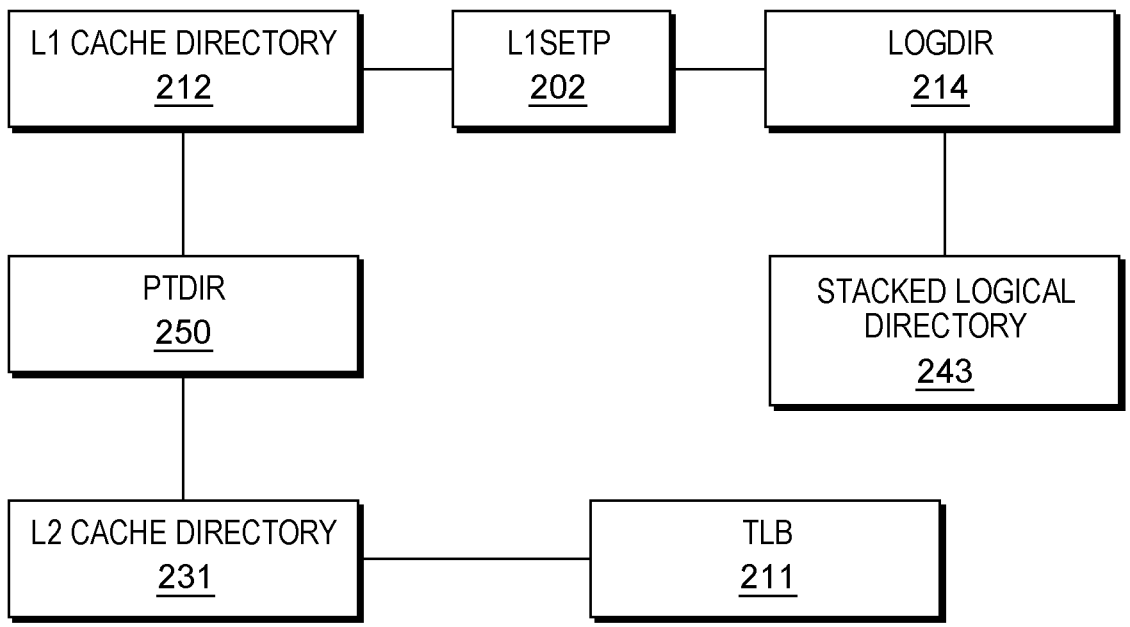
FIG. 2 illustrates a cache scheme in a computing system where certain aspects of embodiments of the present invention may be implemented.

FIGS. 1-2 illustrate two cache schemes in computing systems where implementing the two level set prediction aspect of embodiments of the present invention may improve performance.

FIG. 1 illustrates a computing system where L1 cache and L2 cache are tightly integrated. In that design, the TLB and L2 directory lookups are part of the L1 cache lookup. Therefore, they are on the critical path for L1 and L2 access. Utilizing the L2 set prediction in embodiments of the present invention, L2 data access latency can be decoupled from TLB and L2 directory access latency. FIG. 2 illustrates a computing system with a virtual L1 cache structure. Thus, TLB and L2 directory lookups are only needed on an L1 set predictor miss. However, the TLB and L2 directory lookups are still on the critical path for the L2 access, thus, this cache structure benefits from utilizing the L2 cache set predictor of the present invention.

FIG. 1 illustrates a tightly coupled L1/L2 (two-level) cache structure in which aspects of the present invention may be implemented. The cache structure includes an address generation component 110 that generates a logical address (LA) being accessed. In the depicted example, the logical address has 56 bits (0:55). When utilized without the set predictor aspect of embodiments of the present invention, the address generation component 110 provides the logical address to the translation look-aside buffer (TLB) 111, the level one (L1) cache directory 112, the L1 data cache 113, and the L2 cache directory 131. In the depicted example, the address generation component 110 provides bits 47:55 of the logical address to L2 cache directory 131 and provides bits 50:55 of the logical address to L1 directory 112. The L2 cache directory 131 outputs a valid bit, an exclusivity bit, a key, and an absolute address (AA), based on the received logical address. As understood by one of skill in the art, an absolute address is the result of whatever address translation exists in the (micro) architecture of a processor. The term "absolute address" is utilized because there might be more levels of indirection in the memory subsystem that are not visible to the (micro) processor core.

Returning to FIG. 1, program code that can be characterized as a compare component 132, compares the absolute address received from TLB 111, to the absolute address, provided by the cache directory 131. The compare component 132 then generates an L2 hit signal. In some embodiments of the present invention, the program code that performs this aspect is hardware (i.e., the processor).

FIG. 2 is a microprocessor system that includes a virtual L1 cache structure, meaning that a logically tagged, logically indexed directory ("logdir") is utilized to avoid involving a TLB in an L1 lookup, unlike in the system of FIG. 1. Recent microprocessor architecture allows software to use virtual or logical addresses to reference memory locations, but the program code ultimately performs the access using a physical or absolute address. As demonstrated in FIG. 1, to translate between the two, a TLB 111 (FIG. 1) is involved to perform Dynamic Address Translation (DAT), for example, in the IBM z/Architecture®. z/Architecture is a registered trademark of International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety. IBM® is a registered trademark of International Business Machines Corporation, Armonk, N.Y., USA.

Eliminating the TLB through the virtualization of the L1 cache, as provided in FIG. 2, provides a savings in power consumption. As microprocessor core caches, TLBs also have to grow, such that the power consumption of the TLB lookup, in addition to the directory lookup, is a significant contributor to microprocessor core power. TLB size is also limited by timing constraints, as the TLB lookup itself will become part of the critical path.

Referring to FIG. 2, instead of translating addresses with the TLB 211, for L1 translations, program code accesses a logically indexed, logically tagged L1 directory (logdir) 214, which stores all the translation-relevant information in the L1 cache directory 212. The logdir 214 also resolves synonym problems by using a pointer directory 250 to tie the translation-relevant information in the L1 cache directory 212 and the L2 cache directory 231, together. The TLB 211 is omitted from the L1 cache access, but it is still utilized for accesses to the L2 cache. While the L1 cache is a virtual cache structure, using logical addresses only, the L2 cache is logically indexed, but absolute tagged, a TLB lookup is required to get the absolute address for the L2 directory compare utilized ultimately to retrieve the requested data.

In operation, to perform a lookup, an L1 set predictor (l1setp) 202 predicts the set that holds the requested cache line. Using this information, program code performs a lookup in a stacked logical directory 243 to confirm the cache hit using a tag compare function. In parallel, program code performs a lookup in the pointer directory (ptrdir) 250 to retrieve the valid bit for this directory entry. If the tag compare sees a hit, and the valid bit is set, as the valid compare indicates that a cache hit was found. Only in the event of a setp miss, will the program code access the TLB 211 (using parts of the logical address and translation-relevant information such as an address space identifier), to determine the absolute address for the request. When the set predictor aspect of the present invention in not utilized, in parallel, program code performs a lookup in the L2 cache directory 231, using parts of the logical address as an index and the absolute address as a tag, and performs a hit comparison (hit compare) and searches for a hit in the L2 cache directory 231, resulting in an indication of which set in the L2 cache directory 231 saw the hit. The program code compares this hit information in the pointer directory 250 to see if the cache line indicated is also stored in the L1 cache.

Figure 3:
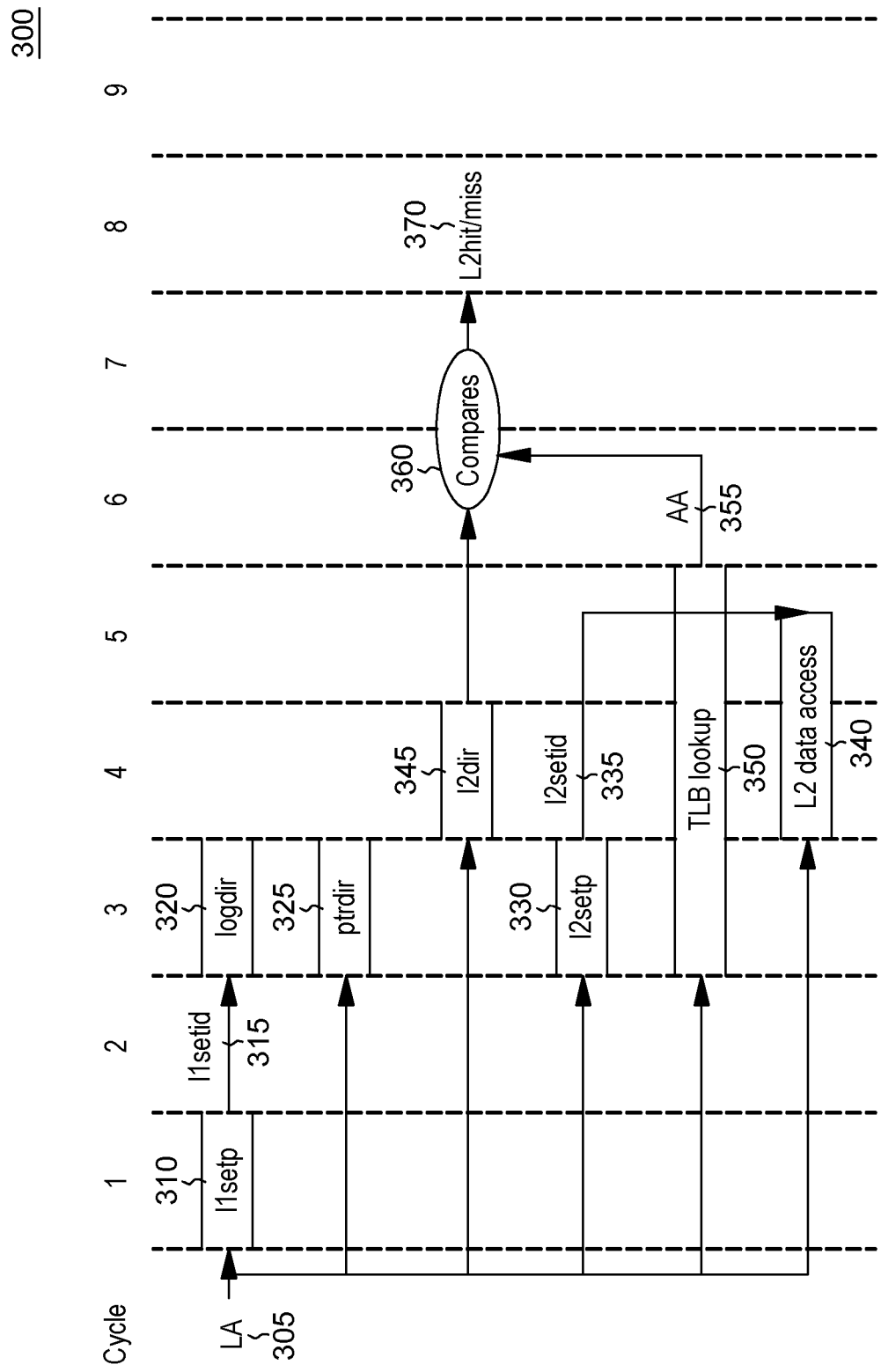
FIG. 3 illustrates a combined L1/L2 cache pipeline structure into which some aspect of embodiments of the present invention has been implemented.

As discussed above, a direct lookup in the L2 cache directory, as discussed in reference to FIG. 2, can increase the cache access latency. Thus, utilizing a second level set predictor, in accordance with an embodiment of the present invention, can improve performance in the cache structure of FIG. 2. FIG. 3 is an example of a combined L1/L2 cache pipeline structure 300, wherein the second level set prediction aspect of embodiments of the present invention has been implemented. In order to illustrate the L2 set prediction, FIG. 3 illustrates how a first level set predictor and a second level set predictor are implemented in a microprocessor system that includes a virtual L1 cache structure, such as the system illustrated in FIG. 2. The illustrated implementation is offered as a non-limiting example and provided to demonstrate the performance advantage of providing a second level of set prediction in a cache structure. As illustrated in FIG. 3, program code adds information to the L2 set predictor (l2setp) 344 that the program code utilizes to identify shared address spaces, and to dynamically adjust the comparisons executed by the l2setp 330, to determine if certain cache lines should be considered shared or not shared.

Referring to FIG. 3, the combined L1/L2 cache pipeline structure 300 provides an accounting of clock cycle numbers to illustrate the progress of the illustrated access. Because an L2 cache is generally considerably larger than the L1 cache, signals have to travel larger physical distances to access the L2 cache, so many of the L2 cache structures are accessed later than L1 cache structures. The timing discrepancy is reflected in FIG. 3 with an access to the L2 cache structure occurring at later (larger) clock cycles, than the L1 cache access. However, depending on the implementation, the actual distances could vary. The L2 cache data and TLB lookup are shown to take more than a single cycle, as these data structures are also often very large and a single-cycle access may not be possible. As discussed above, the memory subsystem uses absolute addresses, including the resultant absolute address (AA) 355 which is why a TLB is utilized in some current systems to translate the address from logical to absolute, in order to access the data.

Referring to FIG. 3, program code requests data from the cache, utilizing a logical address (LA) 305, resulting in the execution of a number of parallel processes/transactions. In some embodiments of the present invention, the program code that requests data from the cache is software. The actions performed by program code described that appear to the right of the logical address 305 in FIG. 3, may be performed by hardware (i.e., the processor), although the generic term, program code, is employed.

Based on the request, to access the cache to provide the requested data, the program code accesses the L1 set predictor (l1setp) 310, which includes performing a tag comparison (not shown). The l1setp 310 predicts a set that holds the requested cache line, identifying it with an identifier, l1setid 315, which the program code utilizes in making a fetch request to the cache. The program code executes a full L1 directory lookup (logdir) 320, in order to verify that the correct set was predicted (and accessed). As aforementioned, performing a data access with a prediction, rather than waiting for the results of a full L1 directory lookup mitigates L1 cache access latency. Also, concurrent with the set prediction by l1setp 310 and the full L1 directory lookup 320, the program code utilizes the LA 305 to access the pointer directory (ptrdir) 325 to get a valid bit for the predicted cache line, and to verify the L1 access. As described in reference to FIG. 2 and now illustrated with clock cycles in FIG. 3, accessing ptrdir 325 is faster than performing a TLB lookup 350.

As discussed above, program code in embodiments of the present invention performs a second level of set prediction in order to mitigate L2 cache latencies. Thus, in FIG. 3, based on the initial data request utilizing a LA 305, an L2 set predictor (l2setp) 330 predicts a set that holds the requested cache line, generating a set identifier (l2setid) 335 of an L2 cache set. The l2setp 330 may also predict an L2 miss, as the prediction may be that no cache line in the L2 cache holds the requested cache line. The aspects involved in predicting L2 cache sets will be described herein.

Parallel to the set prediction, based on the initial request, the program code executes an L2 data access 340, providing all sets in the L2 cache. The program code utilizes the l2setid 335 to select data from the set that was predicted, from the provided sets. In another embodiment of the present invention, at some latency cost, rather than generate an l2setid 335 and perform an L2 data access 340 in parallel, the program code commences the L2 data access 340 after the set predictor has generated l2setid 335. By performing these aspect sequentially, the program code only accesses the correct set. As illustrated by the clock cycles, l2setp 330 may generate the l2setid 335 before the sets are provided via the L2 data access 340.

To avoid latencies, parallel to and/or at some point before a set is identified, based on the initial request, the program code accesses the L2 directory (l2dir) 345 and performs a TLB lookup 350, using the LA 305. The TLB lookup 350 returns the absolute address (AA) 355, while the L2 directory lookup 345 delivers absolute address tags for each of the L2 sets. The program code determines the actual L2 hit set by comparing 360 the AA 355 from the TLB lookup 350 against the AA tags from the L2 directory lookup 345. The comparison results in a hit or in a miss (370).

Figure 4:
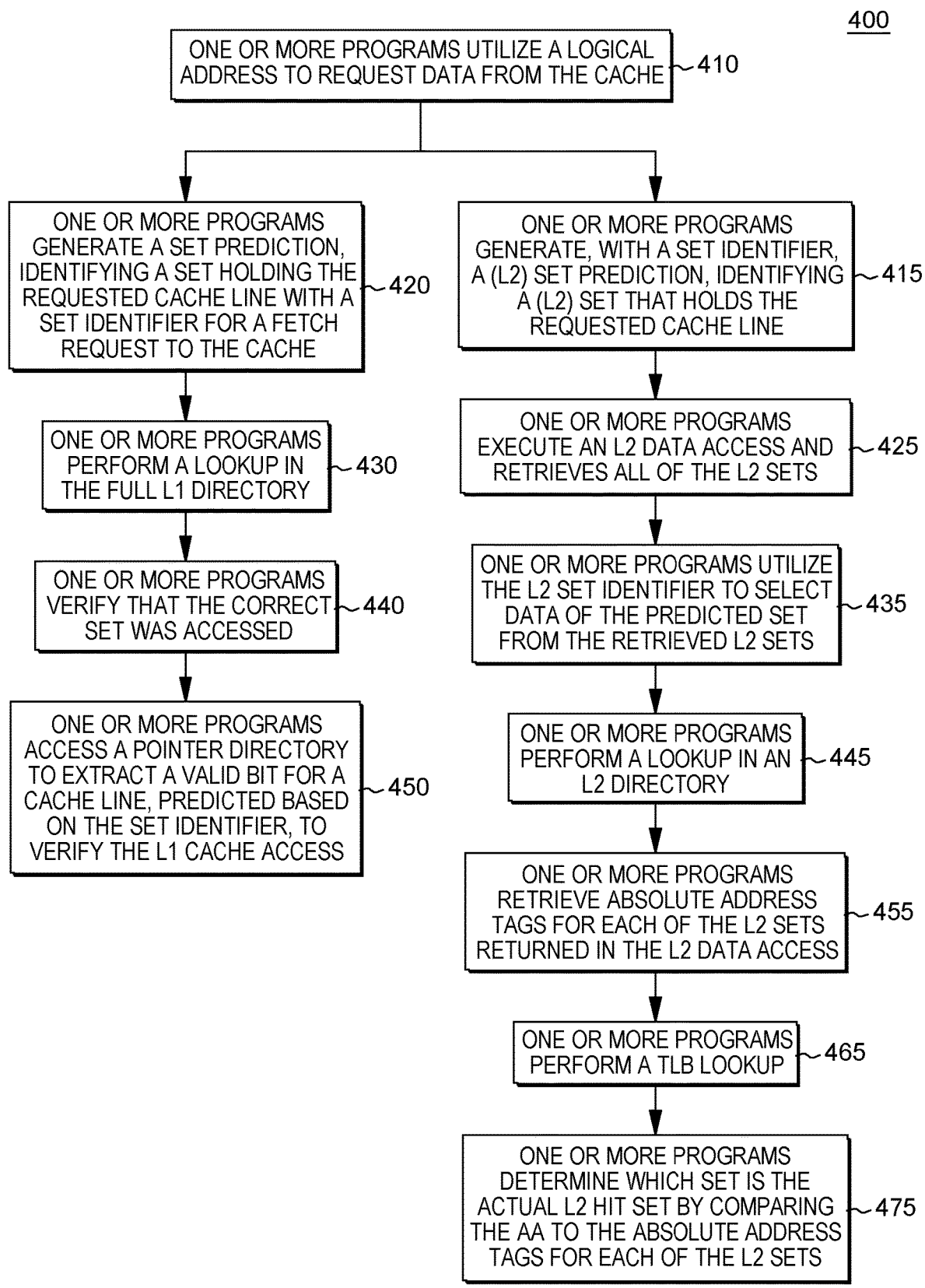
FIG. 4 depicts a workflow that includes various aspects of a data request in some embodiments of the present invention.

FIG. 4 is a flowchart depicting a workflow 400 that includes various aspects of a data request in some embodiments of the present invention. In an embodiment of the present invention, program code utilizes a LA requests data from the cache (410). Based on the request, the program code (an L1 set predictor), generates a set prediction, identifying a set holding the requested cache line with a set identifier for a fetch request to the cache (420). The L1 set predictor utilizes historical data access information to generate this prediction. The program code performs a lookup in the full L1 directory (430). Based on the lookup, the program code verifies that the correct set was accessed (440). The program code accesses a pointer directory to extract a valid bit for a cache line, predicted based on the set identifier, to verify the L1 cache access (450). The program code may access the pointer directory concurrently to predicting a set.

As illustrated in FIG. 4, the program code also accesses an L2 cache to locate the requested information, for example, based on a tight integration of the L1/L2 caches and/or an L1 cache miss. Based on the request (or on an L1 cache miss), program code (an L2 set predictor), generates a (L2) set prediction, identifying, with a set identifier, an L2 set that holds the requested cache line (415). Alternatively, the set predictor may determine that the L2 cache does not contain the requested cache line and predict an L2 cache miss, rather than predicting an L2 set. The program code concurrently or subsequently executes an L2 data access and retrieves all of the L2 sets (425). Provided that the L2 set predictor identifies a set with an L2 set identifier, the program code utilizes the L2 set identifier to select data of the predicted set, from the retrieved L2 sets (435). Utilizing the LA, the program code concurrently or sequentially with the commencement of the L2 cache access, performs a lookup in an L2 directory (445). Based on the lookup, the program code retrieves absolute address tags for each of the L2 sets returned in the L2 data access (455). Utilizing the LA, the program code performs a TLB lookup (465). Based on the TLB lookup, the program code obtains the AA, which is the translated LA. The program code determines which set is the actual L2 hit set by comparing the AA to the absolute address tags for each of the L2 sets (475).

Figure 5:
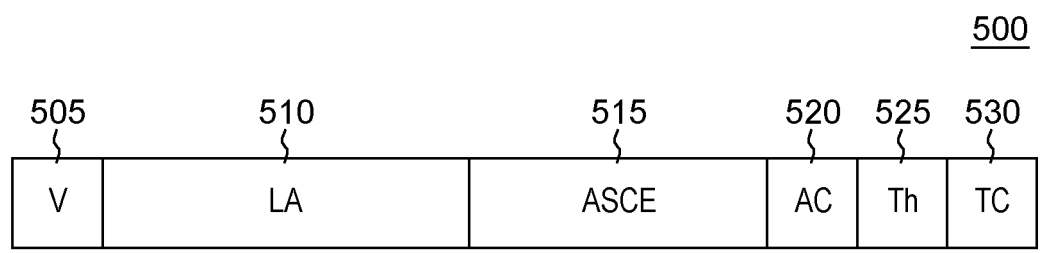
FIG. 5 depicts certain aspects of a tag utilized in lookups in some embodiments of the present invention.
Figure 6:
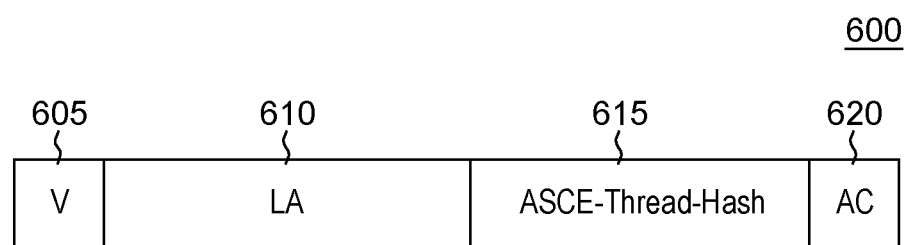
FIG. 6 depicts certain aspects of a tag utilized in lookups in some embodiments of the present invention.

FIGS. 5-6 illustrate aspects of l2setp tags utilized to perform L2 cache lookups, the second of which is optimized. As aforementioned, the L1 set predictor, l1setp, and the L2 set predictor, l2setp, each predict a set that holds a requested cache line (unless the l1setp or the l2setp predict a miss). Like the l1setp, l2setp uses partial address information to predict which (L2) set will have a hit. But while a partial logical address (e.g., LA 510, LA 610) is sufficient in an l1setp tag to identify an L1 cache set, this information may not be specific enough to specify a set in an L2 cache to identify a set.

Referring to FIGS. 5 and 6, the contents of a l2setp tag 500, including an optimized l2setp tag 600 in FIG. 6, in embodiments of the present invention include: 1) a validity indicator (V) 505 605 (e.g., a bit), 2) part of the logical address (LA) 510 610, 3) a partial address space identifier (ASCE) 515 615, and 4) an ASCE Compare value (e.g., bit) (AC) 520 620. In order to support multiple independent threads, the l2setp tag of FIG. 5 also includes a thread-ownership value (e.g., bit) (Th) 525, and a thread compare value (e.g., bit) (TC) 530.

In some embodiments of the present invention, thread ownership values are replaced by per-thread validity values (e.g., valid bits). Thus, instead of having a "valid" value (e.g., bit) and a value that indicates that a given entry is owned by a specified thread, embodiments of the present invention include separate valid bits for different threads (e.g., thread 0, thread 1, ... thread x). Utilizing separate valid bits for different threads improves performance and decreased latency issues.

In general, information has been added to the l2setp that can be used to identify shared address spaces, and dynamically adjust the l2setp compares, if certain cache lines should be considered shared or not shared. The program code may invalidate a tag by changing the value of V 505.

More information beyond a partial LA 510 610 is included in an l2setp tag 500 600 in part because an L2 cache is much larger than an L1 cache, so in an L2 cache, a given LA will exist in many different address spaces, which means that providing a partial LA, only, in a set predictor tag is insufficiently descriptive. The address duplication in L2 caches exists because the l2setp covers a much larger memory than an l1setp: a typical L1 cache might be 128 KB or less in size, while a typical L2 cache could be several MB. Thus, in an L2 cache, unlike in an L1 cache, multiple different address spaces exist in parallel for significant amounts of time. A given LA will exist in many different address spaces due to the size of an L2 cache. Data in the L2 cache stays valid much longer than in an L1 cache, and many different address spaces in an L2 cache, such as those used by multiple different programs running time-sliced, can exist at the same time. For example, in many architectures and operating systems, the start of the address space (e.g., logical address 0) serves special functions, and therefore that LA will exist in many different address spaces. Because a given LA will exist in many different address spaces, space identifiers are used to distinguish these addresses and are part of the L2 cache lookup.

In FIGS. 5-6, the l2setp tag 500 600, includes ASCE 515 615 to identify an address space and a compare value, AC 520 620, to indicate whether ASCE 515 615 should be used for a tag compare. In certain architectures, including but not limited to the aforementioned z/Architecture, different address spaces can be identified using different address space identifiers, ASCE 515 615. However, multiple ASCEs may share the same address space, which can be referred to as a common segment. If the ASCE 515 in the l2setp tag 500 is always used for a tag compare, it will result in poor performance for common-segment cases. Only one ASCE 515 615 can be stored in the l2setp tag 500 at any given time, even though multiple address spaces share the same cache line. This is a circumstance that can result in time-consuming l2setp thrashing. Providing a value like AC 520 620 in an l2setp tag 500 600 prevents this issue because the value of AC 520 620 indicates whether to use ASCE 515 615 in the tag compare. For example, in an embodiment of the present invention, AC 520 620 is a bit and if this bit is set, the ASCE 515 615 is not used for the tag compare.

In some implementations, to save space in the l2setp data structures and to speed up the tag compares, the LA and ASCE can be hashed, as seen in FIG. 6. Hashing ASCE and LA, limits the amount of resources (e.g., hardware resources, bits) needed in the l2setp (FIG. 3, 330) as with a full ASCE and LA. Although utilizing a hash of these values can arguably render the l2setp lookup less "exact" because multiple different LAs/ASCEs map to the same value in the l2setp tag, the conservation of resources justifies the tradeoff in certain embodiments of the present invention. In some systems with resource limits, the implementation of a full ASCE/LA is prohibitive.

If a LA/ASCE hash is used, one or more programs compute it "on the fly" for the l2setp access. That is possible because in the ASCE is known well ahead of time. As illustrated in FIG. 3, cycle 3, the l2setp access is somewhat delayed in the pipeline, while the LA is already available in cycle 0. Thus, there is enough time to hash these values. In the l1setp, the path from address generation (which creates the LA) to the l1setp, is timing critical as this is traditionally one of the timing paths that determines the maximum clock frequency of the chip.

Figure 7:
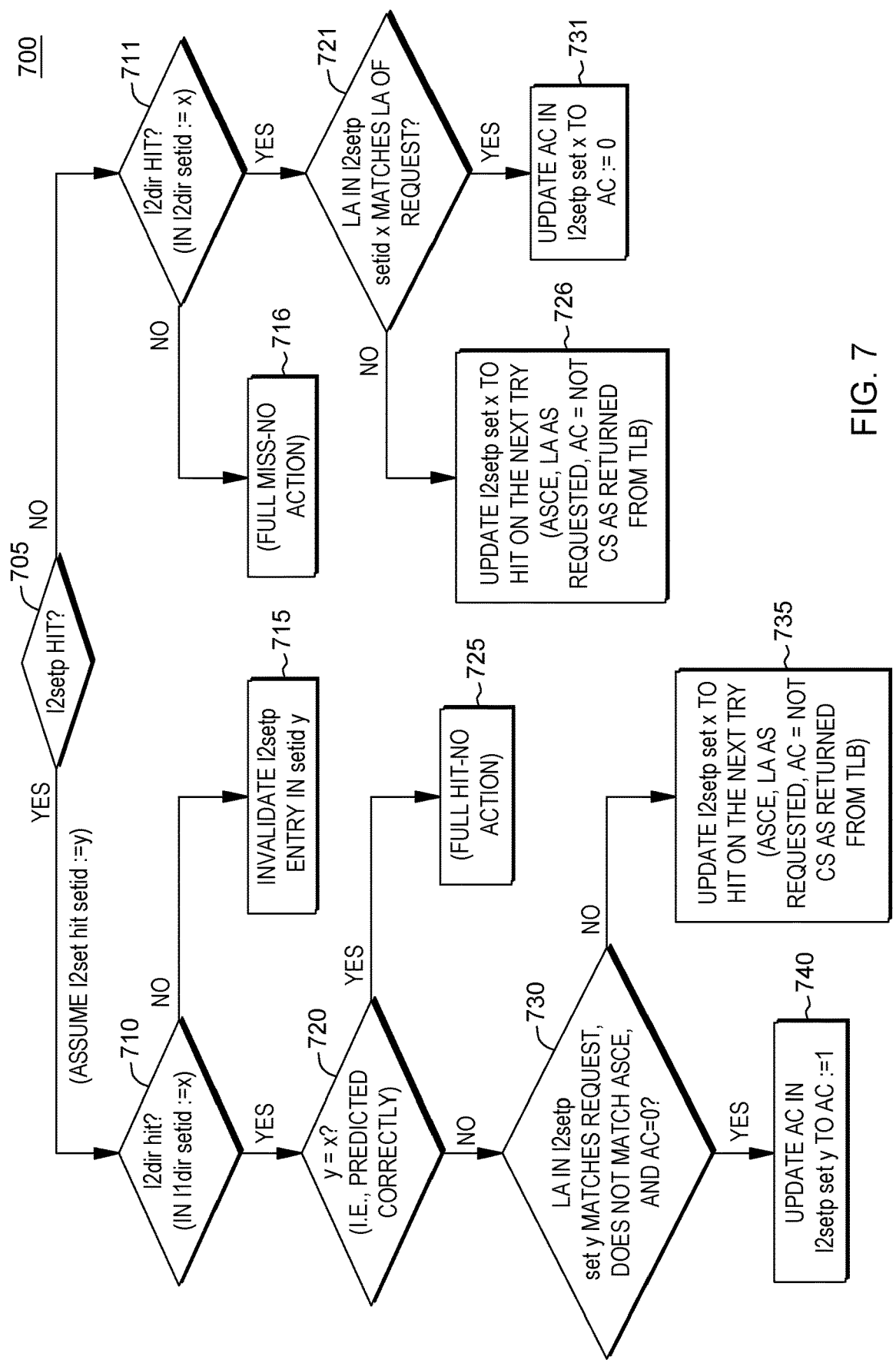
FIG. 7 illustrates aspects of an indicator included in tags utilized in lookups in some embodiments of the present invention.

Referring in FIG. 5, In some embodiments of the present invention, the AC value 520 (e.g., bit) and the TC value (e.g., bit) 535 are used to indicate if the ASCE 515 and Th 530 fields should be used as part of the tag compare (e.g., FIG. 3, compare 360). The setup of the AC value 520 and related updates as illustrated in FIG. 7 as a workflow 700. In general, on install of a new cache line in an L2 cache, the program code initializes the AC value 520 (FIG. 5) to indicate whether a common segment was used. In the event that the AC value 520 is a bit, the program code will initialize the bit to a first value (e.g., 1) unless a common segment was used by the program code. Thus, if a common segment was used, the program code will initialize the bit to a second value (e.g., 0). Use of a common segment indicates that the program may use multiple different ASCEs for the same address space. As an example, l2setp tags with different ASCE values would access the same memory location (e.g., LA=a and ASCE=x would access the same memory location as LA=a and ASCE=y).

FIG. 7 illustrates various details of how the program code manages an AC value in an l2setp tag in some embodiments of the present invention. In some situations, the program code changes the AC value (e.g., turns on a bit) to provide for a comparison, where the value was set to avoid this comparison (i.e., shared address spaces where assumed) (740). In this situation, avoiding the comparison resulted in an incorrect l2setp hit indication. This error is avoided by changing the AC value to perform the comparison. In other situations, the program code changes the AC value (e.g., turns off a bit) to avoid a comparison, where the value was set to avoid perform this comparison (731). This change is precipitated by the previous AC value (e.g., the bit being turned off) resulting in an l2setp miss. By changing this value to indicate to the program code to perform the comparison, the result will be a correct l2setp hit. The program code may also revise the AC value (and potentially other values) of an l2setp tag as a result of the l2setp pointing to an incorrect cache entry (735 and 726).

FIG. 7 illustrates a workflow 700 certain aspects of L2 set prediction in some embodiments of the present invention. As seen in FIG. 7, initially, the program code determines if a set prediction hit has occurred, meaning that a set can be identified as a prediction, by the l2setp (705). Assuming that there is a hit, and in this example the set identifier is a value "y", the program code determines if there is a cache hit in an L2 cache directory (e.g., FIG. 3, 345) (710). In this example, for illustrative purposes, the set identifier in the L2 cache directory is a value "x". If there is no cache hit, the program code invalidates the l2setp entry for the set identifier "y" (715) because the prediction was incorrect, (i.e., x≠y) (e.g., changing the value of V 505, FIG. 5). If there is a cache hit, it is checked whether the l2setp predicted the correct set, indicated if the identifiers are equivalent (i.e., x=y) (720). If the identifiers are equal, the result is a full hit and no further action is taken (725). In the event that the identifiers are not equal, the program code checks the LA, ASCE; and AC values in the l2setp tag. Specifically, the program code may determine if the LA in the designated set, in this example, set "y", matches the LA of the initial request (e.g., FIG. 3, 305), but does not match the ASCE (i.e., a different space is identified), and the AC value indicates not to perform a compare (e.g., AC is a bit and AC=0) (730). If the program code makes this determination, the program code updates the identified set in the l2setp (e.g., the set identified by "y"), so that the l2setp tag identifying this set has an AC value that indicates that a compare should be performed (e.g., an AC bit is turned on such that AC=1). By changing the AC value, the ASCE will be compared next time. In the case where the ASCE did not match, on the next try, there will not be a hit on l2setp setid=y (the set identifier of "y").

In some embodiments of the present invention, the one or more programs may proceed from changing the AC value (e.g., turns on a bit) to provide for a comparison, where the value was set to avoid this comparison (i.e., shared address spaces where assumed) (740), updating the l2setp set identified in the L2 cache directory (i.e., set "x") to appropriately hit on the next try (735). The program code does not perform an arbitrary update, rather, set "x" represents the setid that was hit in the L2 directory lookup (710), that was defined as "set x" earlier. Thus, the program code corrects the l2setp to match the actual L2 directory lookup results. In the absence of mitigating circumstances, in embodiments of the present invention with this workflow (740 to 735), the l2setp will be correct on the next lookup.

Returning to FIG. 7, in embodiments of the present invention where the program code does not update the l2setp set identified in the L2 cache directory (735) after changing the AC value (e.g., turns on a bit) to provide for a comparison, where the value was set to avoid this comparison (i.e., shared address spaces where assumed) (740), the program code may attempt a next try and see an l2setp miss, resolve that (through step 726), and initiate another try to obtain a full hit.

As illustrated in FIG. 7, in the event that the program code determines that the conditions where the LA set identified matches the request, the ASCE not matching, and the AC value indicating no comparison, are not true (730), the program code updates another l2setp set identified in the L2 cache directory (i.e., set "x") to hit on the next try (735). As discussed above, the use of set "x" is not arbitrary and represent the setid that was hit in the L2 directory lookup (710), and was defined earlier in the illustrated workflow 700. Thus, the program code attempts to correct the l2setp to match the actual L2 directory lookup results. In an embodiment of the present invention, the program code sets the AC is if the TLB returns that the ASCE is not using a common segment. As understood by one of skill in the art, the notation "NOT CS" is FIG. 7 describes the use of an Invert function (i.e., "NOT" in logic design terms the value of the "Common Segment" indicator bit).

In the workflow 700 of FIG. 7, the program code determines if a set prediction hit does not occur (705), the program code determines if there is a hit in the L2 cache directory (e.g., FIG. 3, 345) (711). In this example, the set identifier in the L2 cache directory has the value of "x". If there is no hit in the L2 cache directory, the program code determines that a full cache miss has occurred, resulting in no further action (716). In the event of a hit, the program code determines if the LA in the l2setp setid with the same identifier (e.g., "x") matches the LA of the request (721), or LA-hash if a hashed LA is used in the l2setp. In other embodiments of the present invention, this comparison is performed on the ASCE. If there is no match, the program code updates the l2setp set identified in the L2 cache directory lookup (e.g., set "x") to hit on the next try (726). As illustrated in FIG. 7, if the l2setp indicates no hit in setid=x, the l2setp will be updated in its setid x to show a hit the next time. The program code sets the AC is if the TLB returns that the ASCE is not using a common segment. If there is a match, the program code updates the AC in the l2setp tag to a value indicate that no comparison should be performed (731). For example, the program code may set an AC value that is a bit to 0.

The TC value works similarly to indicate thread-ownership. Assuming that multiple threads using the same logical addresses and potentially ASCEs actually share the same memory location, when set to a default value (e.g., when the TC value is a bit and equal to 0), any thread can hit on that entry. However, if it turns out that two threads use the same LA and ASCE fields, but actually different memory locations, the program code can change the TC value (e.g., set a TC bit to 1) to allow each thread to have its own, private l2setp entry.

As seen in FIG. 6, to save more space in the l2setp, the thread-ownership bits can be hashed into or be part of the ASCE field 615. When these values share a field, the AC value update rules remain consistent with the workflow 700 of FIG. 7. However, when the program code updates an AC to enable a comparison (740), the program code also prevents sharing between threads by changing the TC value (e.g., with a TC bit, the program code sets TC to 0). When the program code disables the ASCE comparison for an l2setp set (731), the program code also enables the sharing of an l2setp entry between threads by changing the TC value (e.g., with a TC bit, the program code sets TC to 1).

Figure 8:
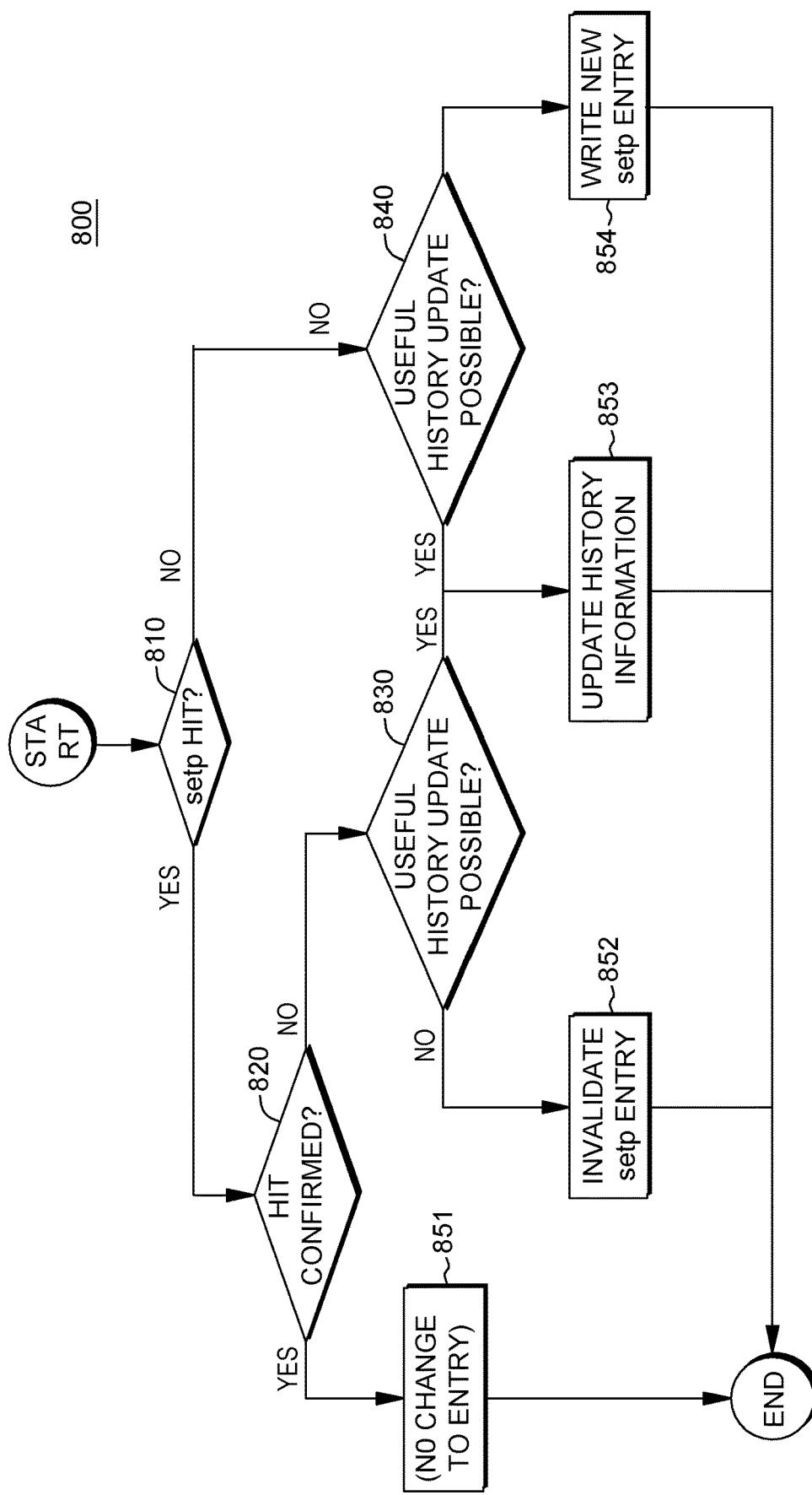
FIG. 8 is a workflow illustrating certain aspects of an embodiment of the present invention.

FIG. 8 illustrates a workflow 800 that provides an overview of how the (L2) set predictor in embodiments of the present invention dynamically adjusts its hit compare, based on the history of previous set predict lookup results. As understood by one of skill in the art, the program code that is referred to as the set predictor of the present invention, although developed to address particular challenges in L2 cache accesses, can be utilized in various caches with similar size challenges. Thus, the set predictor in FIG. 8 is referred to as setp, without specifying a cache level. According to an aspect of certain embodiments of the present invention, the setp performs a lookup, based on historical information, including but not limited to AC or Th values (810). If the lookup resulted in (e.g., "saw") a setp hit (810) the program code attempts to confirm that the hit was on the correct entry (e.g., by performing a full L2 directory lookup) (820). If the program code confirms the hit, no change is made (851). If the program code cannot confirm the hit as being correct, the program code determines, based on available information, if a useful update to the history in the setp entry is possible (830). An example of a potentially useful update would be setting the AC value to avoid false hits. The program code updates the history in the setp entry if the program code determines that a useful update exists (853). In the event that the program code determines that no useful update is possible, the program code invalidates the entry (852).

If the lookup resulted in a setp miss (i.e., no setp hit was seen) (810), the program code determines, based on available information, if a useful update to the history in the setp entry is possible (840). If the program code determine that enough information is available to do a useful history update that would potentially result in a hit on a lookup retry (e.g., clearing the AC value to hit on a shared cache line), the program code updates the historical information (853). In the event that the program code determines that no useful update is possible, the program code rewrites the entry in an attempt to find a clean new hit on retry (854).

Embodiments of the present invention include a computer-implemented method, a computer system, and a computer program product that include one or more programs that perform a cache access to retrieve data, where the cache access is initiated with a request comprising an address of a first address type. The access includes the one or more programs generating, based on historical data related to the address of the first address type, a prediction for a location of the data in the cache comprising a set identifier of a predicted cache set. The one or more program concurrently with the generating, perform a data access to the cache to retrieve sets in the cache. The one or more programs confirm that the retrieved sets include the predicted cache set indicated by the set identifier. Based on the confirming, the one or more programs utilize the set identifier to select data from the predicted set.

In some embodiments of the present invention, the one or more programs retrieve, for each of the identified sets in the cache, from a cache directory of the cache, an address tag of a second address type. The one or more programs translate the address of the first address type into an address of a second address type, where the translating includes performing a lookup in a translation lookaside buffer. The one or more programs determine that the predicted set is a cache set comprising the data responsive to the cache access by verifying that the address of the second address type matches the address tag of the predicted set.

In some embodiments of the present invention, the address of the first address type is a logical address. In some embodiments of the present invention, the address of the second address type is an absolute address. Also, in some embodiments, the cache is a level 2 cache.

In some embodiments of the present invention, the one or more programs receive a cache access request that includes another address that includes a cache line. The one or more programs predict, based on the historical data related to the other address, a cache hit or a cache miss, based on the request. Based on predicting the cache miss, the one or more programs determine if updating the historical data related to the other address would result in the cache hit by identifying updates that would result in the cache hit. Based on predicting a cache hit, the one or more programs provide an identifier for another predicted set comprising the requested cache line.

In some embodiments of the present invention, the one or more programs may also, based on determining that updating the historical data related to the other address would result in the cache hit, update the historical data related to the other address with the identified updates. Based on determining that updating the historical data related to the other address would not result in the cache hit, the one or more programs may replace the historical data related to the other address with a new historical data entry.

In some embodiments of the present invention, based on predicting the cache hit, the one or more programs perform another data access to the cache to retrieve the sets in the cache. The one or more programs determine if the retrieved sets comprise the other predicted cache set indicated by the identifier. Based on determining that the retrieved sets do not comprise the other predicted cache set, the one or more programs determine if updating the other historical data related to the other address would result in the cache hit.

In some embodiments of the present invention, the one or more programs may also update the historical data related to the other address with the identified updates, based on determining that updating the historical data related to the other address would result in the cache hit. Based on determining that updating the historical data related to the other address would not result in the cache hit, the one or more programs may invalidate the historical data related to the other address.

In some embodiments of the present invention, the prediction made by the one or more programs includes a portion of the address of the first address type, a partial address space identifier, an indicator that includes a value. This value indicates a portion of the address tag to be utilized by the one or more programs to verify that the address of the second address type matches the address tag of the predicted set. The one or more programs may update the value of the indicator, to change the portion of the address tag to a different portion of the address tag to be utilized in the verifying. This portion may be an address space identifier or a thread identifier. In some embodiments of the present invention, the prediction made by the one or more programs includes a validity indicator that is specific to a given thread.

In some embodiments of the present invention, the one or more programs perform a second cache access to retrieve the data, wherein the cache access is initiated by the request and the second cache access includes a lookup in a second cache. The one or more programs may commence second cache access concurrently to the cache access. The one or more programs may commence the cache access based on the second cache access resulting in a miss.

In some embodiments of the present invention, the second cache access is to a lower level cache than the cache access.

Referring now to FIG. 9, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, elements of the computer system with the described cache structures, can be understood as cloud computing node 10 (FIG. 9) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
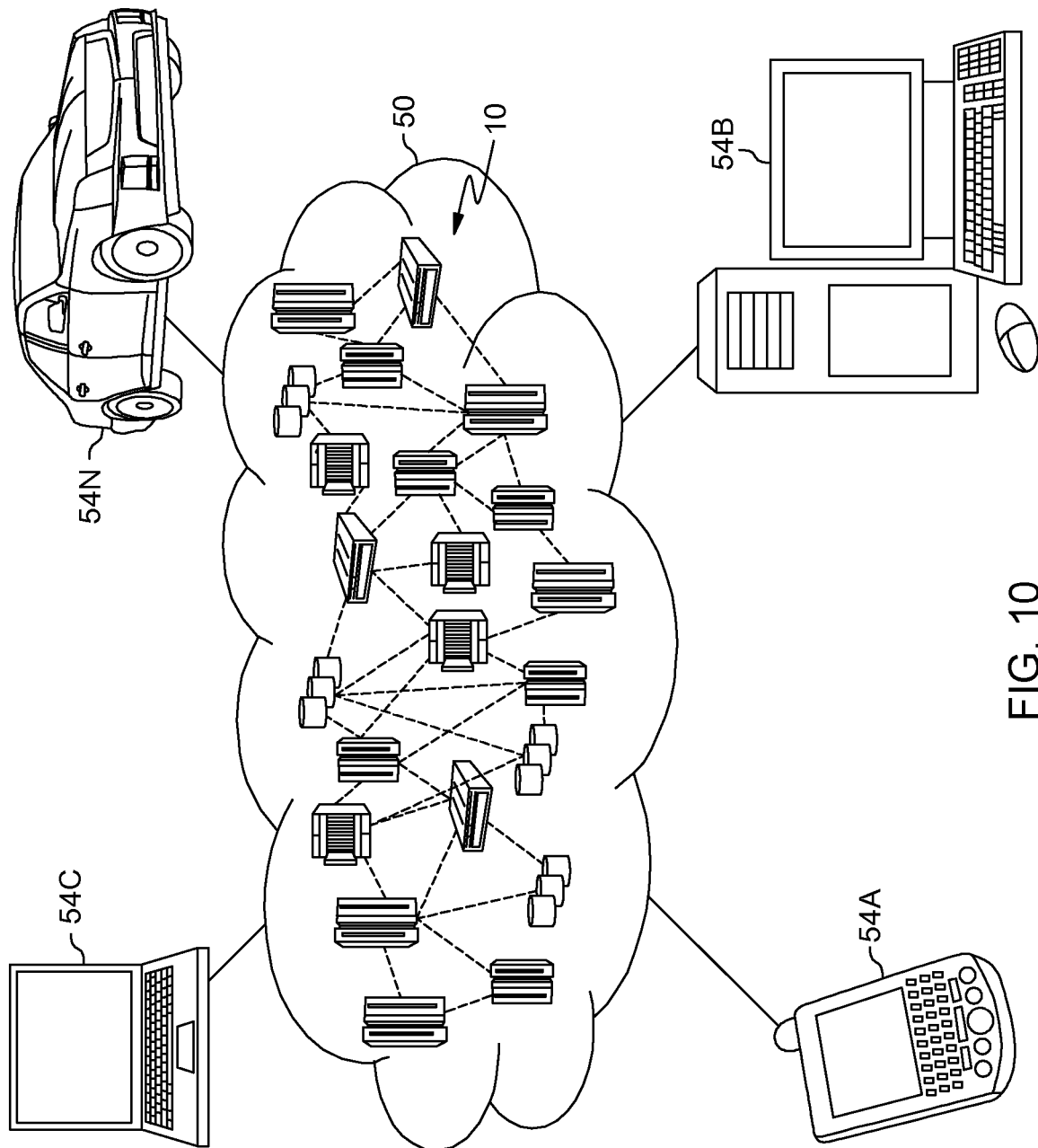
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
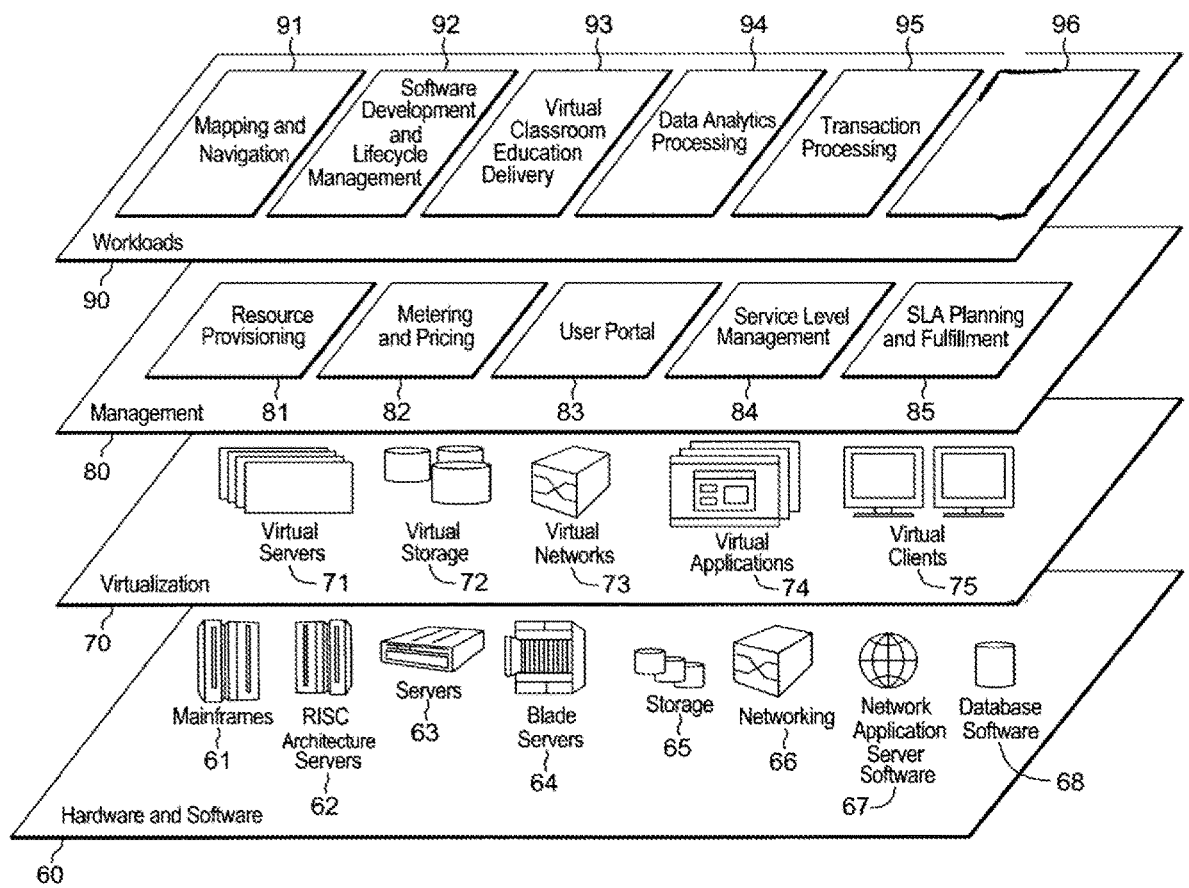
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predicting sets for cache accesses 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
a computer readable storage medium readable by one or more processors and storing instructions for execution by the one or more processors for performing a method comprising:
performing, by the one or more processors, a cache access to retrieve data, wherein the cache access is initiated with a request comprising an address of a first address type, wherein the access comprises:
generating, by the one or more processors, based on historical data related to the address of the first address type, wherein the historical data comprises a history of previous set prediction results, a prediction for a location of the data in the cache comprising: a set identifier of a predicted cache set, a partial address space identifier, and an indicator comprising a value, wherein the value indicates a portion of an address tag to be utilized in the verifying that the address of the second address type matches an address tag of the predicted cache set, wherein the historical data comprises a value selected from the group consisting of: an address space identifier and a thread identifier, and wherein the portion of the address tag to be utilized in the verifying is selected from the group consisting of: the address space identifier and the thread identifier;
concurrently with the generating, performing, by the one or more processors, a data access to the cache to retrieve sets in the cache;
confirming, by the one or more processors, that the retrieved sets comprise the predicted cache set indicated by the set identifier; and
based on the confirming, utilizing, by the one or more processors, the set identifier to select data from the predicted cache set.

2. The computer program product of claim 1, the method further comprising:
retrieving, by the one or more processors, for each of the identified sets in the cache, from a cache directory of the cache, an address tag of a second address type;
translating, by the one or more processors, the address of the first address type into an address of a second address type, wherein the translating comprises performing a lookup in a translation lookaside buffer; and
determining, by the one or more processors, that the predicted cache set is a cache set comprising the data responsive to the cache access by verifying that the address of the second address type matches the address tag of the predicted cache set.

3. A system comprising:
a memory;
one or more processors in communication with the memory; and
program instructions executable by the one or more processors via the memory to perform a method, the method comprising:

performing, by the one or more processors, a cache access to retrieve data, wherein the cache access is initiated with a request comprising an address of a first address type, wherein the access comprises:
generating, by the one or more processors, based on historical data related to the address of the first address type, wherein the historical data comprises a history of previous set prediction results, a prediction for a location of the data in the cache comprising: a set identifier of a predicted cache set, a partial address space identifier, and an indicator comprising a value, wherein the value indicates a portion of an address tag to be utilized in the verifying that the address of the second address type matches an address tag of the predicted cache set, wherein the historical data comprises a value selected from the group consisting of: an address space identifier and a thread identifier, and wherein the portion of the address tag to be utilized in the verifying is selected from the group consisting of: the address space identifier and the thread identifier;
concurrently with the generating, performing, by the one or more processors, a data access to the cache to retrieve sets in the cache;
confirming, by the one or more processors, that the retrieved sets comprise the predicted cache set indicated by the set identifier; and
based on the confirming, utilizing, by the one or more processors, the set identifier to select data from the predicted cache set.

* * * * *